(12) United States Patent
Bhogavilli et al.

(10) Patent No.: US 10,250,618 B2
(45) Date of Patent: Apr. 2, 2019

(54) ACTIVE VALIDATION FOR DDOS AND SSL DDOS ATTACKS

(71) Applicant: VERISIGN, INC., Reston, VA (US)

(72) Inventors: Suresh Bhogavilli, Gaithersburg, MD (US); Roberto Guimaraes, Fairfax, VA (US); Ramakant Pandrangi, Lansdowne, VA (US); Frank Scalzo, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 15/092,165

(22) Filed: Apr. 6, 2016

(65) Prior Publication Data

US 2016/0226896 A1 Aug. 4, 2016

Related U.S. Application Data

(62) Division of application No. 12/982,520, filed on Dec. 30, 2010, now abandoned.

(51) Int. Cl.
*H04L 29/06* (2006.01)
*H04L 9/08* (2006.01)
*H04L 29/08* (2006.01)

(52) U.S. Cl.
CPC ........ *H04L 63/1416* (2013.01); *H04L 9/0825* (2013.01); *H04L 63/0428* (2013.01);
(Continued)

(58) Field of Classification Search
CPC . H04L 63/1441; H04L 63/1458; H04L 63/10; H04L 63/0236
See application file for complete search history.

(56) References Cited

U.S. PATENT DOCUMENTS 6,789,203 B1  9/2004  Belissent
6,944,663 B2  9/2005  Schuba et al.
(Continued)

FOREIGN PATENT DOCUMENTS

WO  2005069732 A2  8/2005
WO  2007125402 A2  11/2007

OTHER PUBLICATIONS

International Search Report and Written Opinion dated Jun. 20, 2012, International Application No. PCT/US2011/064328, filed Dec. 12, 2011, pp. 1-20.
(Continued)

*Primary Examiner* — Robert B Leung
(74) *Attorney, Agent, or Firm* — Artegis Law Group, LLP

(57) ABSTRACT

Methods and systems for detecting and responding to Denial of Service ("DoS") attacks comprise: detecting a DoS attack or potential DoS attack against a first server system comprising one or more servers; receiving, at a second server system comprising one or more servers, network traffic directed to the first server system; subjecting requesting clients to one or more challenge mechanisms, the challenge mechanisms including one or more of challenging requesting clients to follow through HTTP redirect responses, challenging requesting clients to request Secure Sockets Layer (SSL) session resumption, or challenging requesting clients to store and transmit HTTP cookies; identifying one or more non-suspect clients; and forwarding, by the second server system, traffic corresponding to the one or more non-suspect clients to the first server system. Once a client has been validated, clients may communicate directly with application servers in a secure manner by transparently passing through intermediary proxy servers.

47 Claims, 5 Drawing Sheets

(52) U.S. Cl.
CPC .......... *H04L 63/1458* (2013.01); *H04L 67/02* (2013.01); *H04L 2463/141* (2013.01); *H04L 2463/144* (2013.01)

(56) References Cited

U.S. PATENT DOCUMENTS

| | | | |
|---|---|---|---|
| 7,307,999 B1* | 12/2007 | Donaghey | H04L 63/0227 370/389 |
| 7,342,929 B2 | 3/2008 | Bremler-Barr et al. | |
| 7,536,552 B2 | 5/2009 | Touitou et al. | |
| 7,620,733 B1 | 11/2009 | Tzakikario et al. | |
| 7,661,131 B1* | 2/2010 | Shaw | H04L 63/029 709/220 |
| 7,861,286 B2 | 12/2010 | M'Raihi et al. | |
| 8,346,960 B2 | 1/2013 | Spatscheck et al. | |
| 8,370,940 B2 | 2/2013 | Holloway et al. | |
| 2002/0032869 A1 | 3/2002 | Lamberton et al. | |
| 2002/0083175 A1* | 6/2002 | Afek | H04L 63/1416 709/225 |
| 2003/0061510 A1* | 3/2003 | Hartmann | H04L 63/04 726/23 |
| 2003/0076848 A1 | 4/2003 | Bremler-Barr et al. | |
| 2003/0229809 A1 | 12/2003 | Wexler et al. | |
| 2004/0143670 A1 | 7/2004 | Roychowdhury et al. | |
| 2004/0148520 A1* | 7/2004 | Talpade | H04L 63/0227 726/22 |
| 2004/0158766 A1 | 8/2004 | Liccione et al. | |
| 2004/0250124 A1* | 12/2004 | Chesla | G06F 21/552 726/13 |
| 2005/0050364 A1 | 3/2005 | Feng | |
| 2005/0235358 A1 | 10/2005 | Keohane et al. | |
| 2005/0256968 A1 | 11/2005 | Johnson | |
| 2006/0031680 A1 | 2/2006 | Maiman | |
| 2006/0107318 A1 | 5/2006 | Jeffries et al. | |
| 2006/0112176 A1 | 5/2006 | Liu et al. | |
| 2006/0185014 A1* | 8/2006 | Spatscheck | H04L 63/1458 726/23 |
| 2006/0206922 A1 | 9/2006 | Johnson et al. | |
| 2007/0022474 A1 | 1/2007 | Rowett et al. | |
| 2007/0083670 A1 | 4/2007 | Kelley et al. | |
| 2007/0118894 A1 | 5/2007 | Bhatia | |
| 2007/0157300 A1 | 7/2007 | Sivaradjane et al. | |
| 2007/0214505 A1 | 9/2007 | Stavrou et al. | |
| 2007/0266426 A1 | 11/2007 | Iyengar et al. | |
| 2008/0034424 A1 | 2/2008 | Overcash et al. | |
| 2008/0159299 A1 | 7/2008 | Bu et al. | |
| 2009/0144806 A1 | 6/2009 | Gal et al. | |
| 2009/0222561 A1 | 9/2009 | George et al. | |
| 2011/0154472 A1 | 6/2011 | Anderson et al. | |
| 2011/0277027 A1 | 11/2011 | Hayton et al. | |
| 2011/0282908 A1 | 11/2011 | Fly et al. | |
| 2012/0008567 A1 | 1/2012 | Eisl et al. | |
| 2012/0023558 A1 | 1/2012 | Rafiq | |
| 2012/0117222 A1 | 5/2012 | Holloway et al. | |

OTHER PUBLICATIONS

Author Unknown, "VeriSign Internet Defense Network Overview", Jun. 1, 2009, pp. 1-4.
Brough Davis, "Leveraging the Load Balancer to Fight DDoS", InfoSec Reading Room, SANS Institute, Jul. 30, 2010, pp. 1-45.
Wang et al., "WRAPS: Denial-of-Service Defense through Web Referrals", 25th IEEE Symposium on Reliable Distributed Systems (SRDS '06), 2006, pp. 1-10.
Roger P. Karrer, "EC: an edge-based architecture against DDoS attacks and malware spread", Proceedings of the 20th International Conference on Advanced Information Networking and Applications (AINIA '06), 2006, pp. 1-5.
Author Unknown, Cisco Guard Configuration Guide, Configuring Zone Filters, http://www.cisco.com/en/US/docs/security/anomaly_detction_mitigation/appliances/guardiv5.0/configuration/guide/conffilt.html#wp1135548, retrieved Dec. 30, 2010, pp. 1-15.
Mudhakar Srivatsa et al., "Mitigating Application-Level Denial of Service Attacks on Web Servers: A Client-Transparent Approach", ACM Transactions on the Web, vol. 2, No. 3, Article 15, Jul. 2008, pp. 1-49.
Extended European Search Report dated Feb. 10, 2015, European Application No. 14194219.3, filed Nov. 21, 2014, pp. 1-8.
Angelos Stavrou, "An Overlay for End-to-End Service Availability", Columbia University, ProQuest, UMI Dissertations Publishing, 2007, pp. 1-206.
Myungkeun Yoon, "Using Whitelisting to Mitigate DDoS Attacks on Critical Internet Sites", Communications Magazine, IEEE, Dept. of Electr. Eng. & Comput. Sci., Kookmin Univ., Seoul, South Korea, vol. 48, Issue 7, Jul. 2010, pp. 110-115.
Michael Walfish et al., "DDoS Defense by Offense", SIGCOMM '06 Proceedings of the 2006 Conference on Applications, Technologies, Architectures, and Protocols for Computer Communications, 2006, pp. 303-314.
Harkeerat Singh Bedi et al., "Game Theory-based Defense Mechamisms Against DDoS Attacks on TCP/TCP-friendly Flows", 2011 IEEE Symposium on Computational Intelligence in Cyber Security (CICS), Apr. 11-15, 2011, pp. 129-136.
Tao Peng et al., "Survey of Network-based Defense Mechanisms Countering the DoS and DDos Problems", Journal, ACM Computing Surveys (CSUR) Surveys Homepage archive, vol. 39, Issue 1, 2007, Article No. 3, pp. 1-46.
European Search Report for application No. 14 19 4219, dated Feb. 3, 2015, 3 pages.

* cited by examiner

ACTIVE VALIDATION FOR DDOS AND SSL DDOS ATTACKS

RELATED APPLICATION

This application is a divisional of, and claims the benefit of, co-pending U.S. application Ser. No. 12/982,520 entitled, "ACTIVE VALIDATION FOR DDOS AND SSL DDOS ATTACKS" and filed Dec. 30, 2010, the entirety of which is hereby incorporated by reference.

TECHNICAL FIELD

The present disclosure relates generally to methods and systems for detecting and responding to Denial of Service and other cyber attacks against servers and web servers.

BACKGROUND

A server is a computer or other electronic device that is configured to provide services or resources to other requesting devices. The server typically provides one or more communication links for receiving communications from other networked devices, known as "clients," and executes one or more processes whose function it is to continually monitor those communication links for incoming messages from clients. In order to service a client request, the server typically must expend system resources, such as memory, processor cycles, or bandwidth. Although the server may elect not to service some clients or client requests, the server must nonetheless devote at least some system resources to receive a client communication and determine whether or not to service it.

In some communications protocols, such as the Transmission Control Protocol (TCP) and the hypertext transfer protocol (HTTP), servers are configured by default to accept and service requests from any client provided the client conforms to the protocol. For example, public-facing web servers are typically configured by default to attempt to service any HTTP request received from any client—for example an HTTP request for a web page—without discriminating between clients or client requests.

Although this characteristic of many communications protocols provides many benefits in terms of readily available network services, it may also leave servers vulnerable to cyber attacks. For example, in a denial-of-service ("DoS") attack, a client may attempt to overwhelm a server by sending a large number of requests to the server in rapid succession. Because web servers are configured by default to accept requests from all clients, and because the HTTP protocol provides little information about the requesting client that would enable the server to determine the nature of the client's intentions in making the request, the attacked web server may be slow or unable to respond to other, legitimate requests due to the burdens imposed on the server when servicing the flood of requests from the single malicious client.

DoS attacks, however, are often easy to detect and overcome, because, in many cases, all malicious requests from a single attacking client will originate from the same Internet Protocol ("IP") address. Therefore, it may be easy to detect that a server is under attack by simply observing a large increase in traffic over normal loads and that a large percentage of that traffic is associated with a single IP address. The server may then overcome the attack by ignoring all requests from the identified IP address.

Because of the ease with which DoS attacks may be detected and overcome, one variation on the DoS attack is the distributed denial-of-service ("DDoS") attack. In a DDoS attack, rather than having a single client make all of the nuisance requests to the server, the attacker utilizes a network of different clients to simultaneously issue requests to the server. Such a network of requesting clients may be at the attacker's disposal by virtue of an in-place "botnet" in which hundreds or thousands of normal users' computers are infected by malware that is programmed to respond to commands issued by a central machine or authority known as a "bot master." Bot masters may make use of such a collection of "zombie" machines in order to implement a DDoS attack on a server or enterprise.

In a DDoS attack, because the flood of requests may be spread over a large number of disparate clients, each with a different IP address, it may be difficult to detect which requests originate from legitimate clients and which requests originate from malicious clients, such as compromised "zombie" machines in a botnet. Thus, a server may not be able to determine which requests it should ignore and which requests it should service, because all requests may appear substantially identical over the larger pool of IP addresses.

One technique for discriminating between legitimate requests and malicious requests is to use a client "challenge" mechanism in which each requesting client is challenged to first perform an operation specified by the server before the server will commit further resources to servicing the client's request. Frequently, clients that participate in a DDoS attack are programmed to issue requests to the server in a "dumb" fashion—i.e., to perform only the operations necessary to cause the server to allocate resources and bandwidth while minimizing the number of operations that must be performed by the client. For example, when making an HTTP request to a server, a client typically must (1) construct and transmit the HTTP request and (2) receive and process the HTTP response from the server. Since the goal of a DDoS attack may be to burden the attacked server as much as possible while minimizing the burden on the attacking clients, the clients may be programmed to simply ignore any HTTP responses transmitted by the attacked server and thus to not devote any resources or processor cycles to processing the responses. Therefore, by requiring clients to perform preliminary tasks to demonstrate that they are normal clients and not merely "dumb" attack scripts, servers may be able to separate legitimate clients from malicious clients.

Conventional client challenge mechanisms, however, suffer from a number of drawbacks. Most importantly, they require the server to expend resources challenging clients and determining which clients have successfully completed the challenge. Even though the client challenge mechanism may permit the server to thereafter ignore any requests or communications from clients who did not complete the challenge, if a DDoS attack is perpetrated by a large enough number of clients in a botnet, it may not matter whether any one particular client ever attempts to make a second request after failing to complete the challenge. The task alone of challenging each requesting client may be sufficient to overwhelm the server. This drawback may be fatal for mitigating against another variation on the DDoS attack known as an SSL DDoS attack.

There is therefore a need for methods and systems for overcoming these and other problems presented by the prior art.

SUMMARY OF THE INVENTION

The present invention comprises methods and systems for mitigating against DoS and DDoS attacks, including SSL DoS and DDoS attacks. In one aspect of the invention, one or more proxy servers monitor one or more application servers configured to receive and service requests from clients. If the proxy servers detect that the application servers are under a DoS and DDoS attack, the proxy servers initiate a process to reroute traffic intended for the application servers to the proxy servers. The proxy servers analyze the rerouted traffic to identify which clients are malicious, for example using one or more client-challenge mechanisms. The proxy servers forward only legitimate traffic to the application servers and either discard or rate-limit all other traffic.

In other aspects of the invention, clients may be challenged to demonstrate their legitimacy by honoring HTTP redirects, performing SSL resumption operations, storing and transmitting HTTP cookies, etc. In yet another aspect of the invention, clients are subjected to multiple challenges in an incremental fashion until a sufficient amount of malicious traffic has been identified.

In another aspect of the invention, once a client has been validated, that client is enabled to communicate directly with the application servers. If the validated client is also communicating using a secure connection, the proxy servers also cease to perform decryption operations on communications from that client in order to allow the client and the application servers to securely communicate through the proxy servers without the proxy servers having access to unencrypted communications. Once the DoS or DDoS attack has subsided, traffic intended for the application servers is rerouted back to the application servers.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings.

DETAILED DESCRIPTION

Figure 1:
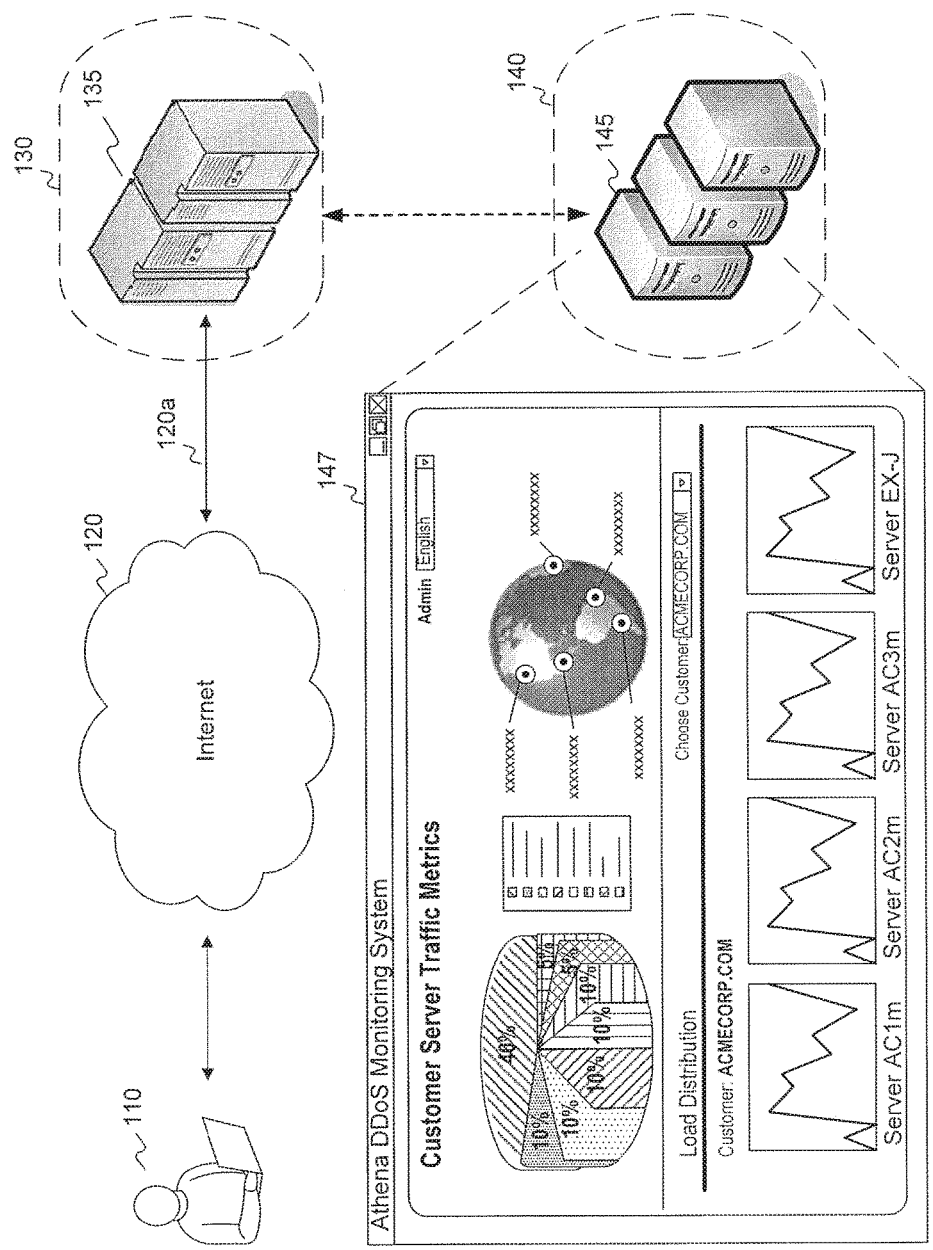
FIG. 1 is a diagram illustrating exemplary communications between application servers and clients, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 is a diagram illustrating communications between one or more exemplary application servers and one or more clients consistent with certain disclosed embodiments. As shown in FIG. 1, one or more application servers 135 provide services to one or more clients or end users 110. Application servers 135 may comprise commercial web servers that service HTTP requests from clients 110 for web pages hosted by the application servers 135. Clients 110 communicate with application servers 135 through the Internet 120 and using normal Internet communications protocols, such as HTTP, TCP, and IP. Although application servers 135 may operate one or more applications or provide one or more public-facing network services, application servers 135 comprise any servers capable of being subjected to a cyber attack, such as a DoS attack, and need not operate any particular application or host any particular services.

In the embodiment of FIG. 1, clients 110 communicate directly with application servers 135 via Internet 120. For example, HTTP requests from clients 110 may be encapsulated in TCP segments, IP datagrams, and Ethernet frames and transmitted to servers 135. In some embodiments, the only third parties that participate as intermediaries in the communication are Internet Service Providers (ISPs) or other entities that provide routers and link layer switches that do not analyze or review the contents of the Ethernet frames beyond the link layer and the network layer, but instead analyze only those parts of the packet necessary to route communications from clients 110 to application servers 135.

Application servers 135, or routers providing Internet connectivity to application servers 135, may be monitored by one or more monitoring servers 145. Monitoring servers 145 may monitor application servers 135 for the purpose of determining whether application servers 135 are receiving network communications or are functioning in a normal or expected manner or whether application servers 135 are functioning in a non-normal manner that may indicate the presence of a DoS attack. A "DoS attack" may refer to a traditional DoS attack, in which all malicious requests or communications originate from a single device, a DDoS attack, in which multiple, separate devices may participate in the attack, or other types of cyber attacks.

In one embodiment, a third-party mitigation service provider 140 may operate monitoring servers 145, which monitor application servers 135, pursuant to a commercial mitigation service provided to customer 130, which may own or operate application servers 135. Although FIG. 1 depicts monitoring servers 145 as communicating with application servers 135 using a direct communications link or a communications link separate from Internet 120, those skilled in the art will appreciate that monitoring servers 145 may also communicate with application servers 135 via an indirect network connection, such as a network connection through Internet 120. Monitoring servers 145 may be within the network path between clients 110 and application servers 135 or may be outside of the path.

Figure 2:
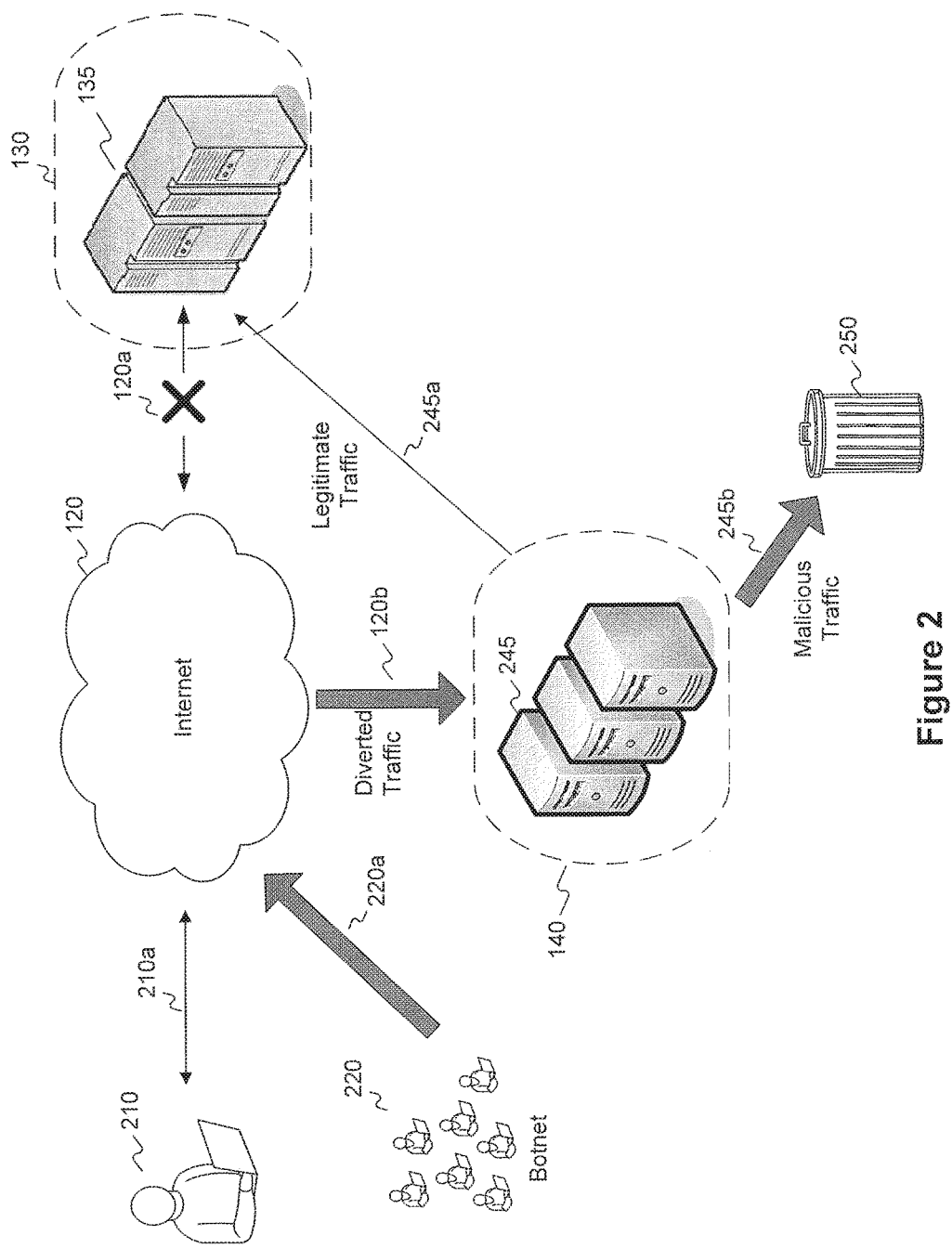
FIG. 2 is a diagram illustrating an exemplary method of diverting traffic intended for application servers to a mitigation site in the event of a DoS attack, consistent with certain disclosed embodiments.

FIG. 2 is a diagram illustrating an exemplary method of diverting traffic intended for one or more application servers to a mitigation site for filtering the traffic in the event of a DoS attack, consistent with certain disclosed embodiments. As shown in FIG. 2, although legitimate clients 210 are making normal requests to application servers 135, additional clients 220 that are part of a botnet are also making requests to application servers 135. In FIG. 2, traffic 220a from malicious clients 220 is depicted as a thick arrow, whereas traffic 210a from legitimate clients 210 is depicted as a thin arrow, to illustrate that traffic 220a may be significantly heavier than traffic 210a. Once a DoS attack on application servers 130 is detected, all traffic 120b to application servers 135 may be diverted to proxy servers 245, such that clients may no longer be able to establish a direct connection 120a with application servers 135 via Internet 120. In some embodiments, proxy servers 245 may be operated by the same third-party mitigation service provider 140 that operates monitoring servers 145. Moreover, in certain embodiments the same physical servers may perform the roles of both monitoring servers 145 and proxy servers 245. Proxy servers 245 may also be within the network path between clients 110 and application servers 135 or may be outside of the path.

Traffic 120b may be redirected to proxy servers 245 using a number of different techniques. For example, using features provided by the Border Gateway Protocol ("BGP"), an inter-Autonomous System routing protocol used by ISPs, proxy servers 245 may advertise their availability to route communications to the IP addresses associated with application servers 135 or may advertise that they themselves terminate such IP addresses, in a process known as a "BGP swing." As the result of a BGP swing, communications intended for application servers 135, such as communications from clients 210 and 220, may terminate at proxy servers 245 such that proxy servers 245 may communicate with clients 210 and 220 on behalf of application servers 135, typically without detection.

Alternatively, either application servers 135 or proxy servers 245 may initiate a request to one or more Domain Name Service ("DNS") servers to reassign domain names hosted by application servers 135 to IP addresses assigned to proxy servers 245. This process of DNS record alteration may additionally be facilitated or expedited if application servers 135 and/or proxy servers 245, or the entities associated therewith, operate authoritative DNS servers or have other primary or authoritative roles in the DNS system. Those skilled in the art will appreciate that other techniques may be used to redirect traffic intended for application servers 135 to proxy servers 245. Those skilled in the art will also appreciate that the techniques described in this application may also be applied in the context of an "always-on" DDoS mitigation service in which proxy servers, such as proxy servers 245, may always be in the communication path between clients and the application servers. In that case, there may be no need to redirect the traffic to the proxy servers when an attack is detected.

Once traffic 120b has been diverted to proxy servers 245, proxy servers 245 may filter the traffic by categorizing the traffic into communications from legitimate clients and communications from malicious clients, such as DoS participants. All legitimate traffic 245a may be forwarded to application servers 135, while other traffic 245b may be discarded (item 250). Alternatively, to avoid denying service to a legitimate client incorrectly identified as malicious, some or all traffic 245b could be forwarded to application servers 135 or otherwise serviced, for example at a much lower priority than traffic 245a, a process known as "rate-limiting" (operations not depicted in FIG. 2.).

In one embodiment, proxy servers 245 may be owned or operated by a third party that provides proxy services as part of a broader DoS mitigation service. One advantage of employing a separately-owned or operated mitigation server system may be the third party service provider's ability to bear computational and connection burdens that a customer's server system could not. For example, customer 130 may be a small company that does not have the resources to operate separate proxy servers to perform mitigation services. Or, even if customer 130 also operated separate proxy servers, such proxy servers might not be able to bear the burden of a full DDoS attack by separately analyzing each requesting client to determine legitimacy. This aspect of invention may be contrasted with conventional systems that focus on equipping servers that are being attacked or other servers operated by the attacked entity to filter legitimate requests from malicious requests. These systems fail when filtering operations themselves are sufficient to overwhelm the owner of the attacked servers or associated proxy servers.

For example, some DoS-mitigation techniques attempt to filter traffic as early as possible in the communications process, before the attacked servers devote any significant resources, such as during the preliminary TCP handshake. This technique is particularly ineffective, since very little information may be gleaned during the TCP handshake to enable a server to separately identify legitimate versus malicious clients. Another technique is to send the client a client-side script, such as a piece of JavaScript code, in response to the client's first HTTP request. The client-side script may require the client to demonstrate its legitimacy by solving a cryptographic puzzle in the code. However, any techniques that focus on challenging the client at the HTTP application layer would be ineffective for mitigating against SSL DDoS attacks.

In an SSL DDoS attack, prior to making any application layer requests or communications to servers, malicious clients first request a secure channel of communication with the server using the Secure Socket Layer ("SSL") protocol. In an SSL connection, a client and server may communicate securely by encrypting data transmitted back and forth using a symmetric private key protocol, such as the Data Encryption Standard ("DES") or Advanced Encryption Standard ("AES"). In order for the client and server to encrypt communicate using symmetric private keys, however, they must first securely exchange private keys using an asymmetric encryption protocol that employs public-private key pairs, such as the Rivest-Shamir-Adleman ("RSA") or Diffie-Hellman protocols. In particular, both the client and the server must transmit their respective public keys to each other and must compute a "Pre-Master Secret" ("PMS") using each other's public keys, which will be used to generate the symmetric private keys to encrypt subsequent communications between the client and the server, a process known as an "SSL handshake." Thereafter, the client and the server may communicate using an application layer protocol, e.g., "HTTPS," that is encrypted using the SSL session.

The process of encrypting or decrypting data using an asymmetric public or private key (e.g., generating the PMS) is an expensive operation that requires a host system to perform exponentiation over large numbers. As a result, in order to preserve resources, many servers are configured to limit the number of concurrent SSL sessions that they will allocate to clients. In an SSL DDoS attack, an attacker may be able to tax a server's resources using far fewer attacking clients by having each participating client request an SSL session (or multiple SSL sessions) from the server. Each SSL session request causes the server to perform the expensive exponentiation operations and to allocate separate memory for each requested SSL session. Moreover, if the server is configured to allocate only a limited number of SSL sessions, the DDoS malicious clients may consume all available secured sockets, thus causing the server to deny SSL connections to legitimate users. The DDoS clients may tax the server's resources by simply requesting new SSL sessions, even if they never make any subsequent requests to the server using the SSL sessions. In fact, precisely to avoid requiring the client to also perform expensive exponentiation operations, clients that participate in an SSL DDoS attack may not even complete the SSL handshake from their end, another example of how attack scripts may be "dumb." Although the failure to complete the SSL handshaking operations may allow the server to avoid allocating an SSL socket to such clients, the server may be sufficiently burdened by simply having to perform the exponentiation operations in the partial, failed handshakes that the SSL DDoS attack may nevertheless be successful.

A third-party mitigation service consistent with embodiments of the present invention may be effective for overcoming these and other limitations of conventional DoS mitigation processes. For example, a third-party mitigation service provider with a sufficiently robust technical infrastructure may be able to fully analyze and evaluate all requesting traffic during a DoS attack, even if such operations require the service provider to bear the full brunt of the DoS attack. In the area of SSL DDoS attacks, in particular, a third-party mitigation service provider may have the resources to open a separate SSL socket and every requesting client in order to challenge the SSL clients using HTTP and other challenge mechanisms. Examples of such challenge mechanisms will be further described with respect to FIGS. 3-5.

Figure 3:
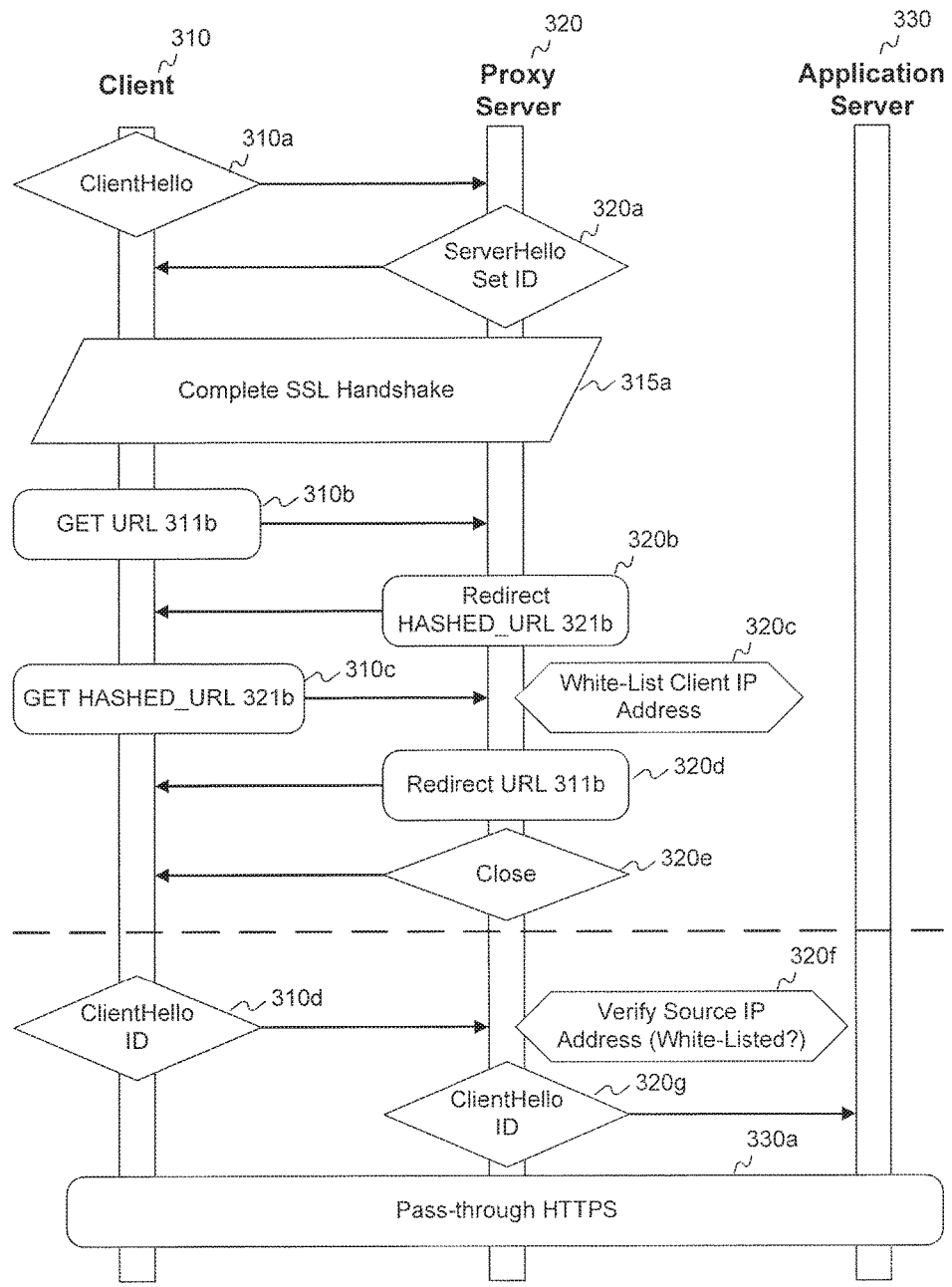
FIG. 3 is a flow diagram illustrating an exemplary method of validating clients using HTTP redirects, consistent with certain disclosed embodiments.

FIG. 3 is a flow diagram illustrating an exemplary method of validating clients by requiring clients to follow through with HTTP redirects, consistent with certain disclosed embodiments. In the method of FIG. 3, in response to a detected DoS attack, direct communication between application servers 330, owned or operated by customer 130, and clients 310 has been disabled. Client traffic has been diverted to one or more proxy servers 320, e.g., owned or operated by third-party service provider 140, for the purpose of identifying which clients 310 are legitimate and which clients 310 are malicious. In particular, FIG. 3 depicts a method for challenging clients that, prior to making any application-layer requests, have requested a secure channel of communications through, e.g., SSL.

In step 310a, client 310 requests an SSL session from proxy server 320 by sending a standard SSL "ClientHello" message. In SSL, the "ClientHello" message contains the SSL version and a list of cryptographic algorithms that the client can support, as well as the client's maximum key length. Although not depicted, prior to this request, client 310 and proxy server 320 may have exchanged other messages in order to establish a TCP connection.

In response to the "ClientHello" message, proxy server 320 sends a "ServerHello" message to client 310 to indicate which of the client-listed cryptographic algorithms it has selected, as well as the key lengths to be used in the subsequent conversation (step 320a). The proxy server 320 also assigns an SSL session ID to uniquely identify the client 310 during subsequent requests from client 310 and stores that session ID in memory.

Before the SSL session is established, client 310 and proxy server 320 may exchange a number of additional messages. For example, proxy server 320 may provide client 310 with a copy of its public key and a certificate, e.g., from a Certificate Authority ("CA"), attesting to the authenticity of the public key. Client 310 may then generate a symmetric key, encrypt the symmetric key using the public key provided by proxy server 320, and transmit the encrypted symmetric key to proxy server 320 for use during subsequent communications. The proxy server 320 in turn decrypts the symmetric key using its private key. This decryption operation in particular may cause proxy server 320 to perform exponentiation and therefore to expend non-trivial resources. In the event that mutual authentication is requested, client 310 also provides a copy of its public key and CA-issued certificate, which are verified by proxy server 320, also requiring an exponentiation operation. These and other operations comprise a process known as an SSL "handshake" 315a.

For proxy server 320 to communicate with client 310 using SSL in a manner that allows proxy server 320 to impersonate application server 330, proxy server 320 provides client 310 with a copy of one of customer 130's public keys and the certificate issued to customer 130 vouching for the authenticity of that public key. Otherwise, client 310 may reject any other public key that proxy server 320 may provide as not belonging to customer 130, the party with whom client 310 is attempting to communicate. However, proxy server 320 will not be able to decrypt communications from client 310 that have been encrypted using customer 130's public key unless proxy server 320 also has access to customer 130's private key. Thus, in one aspect of the disclosed invention, proxy server 320 is entrusted with customer 130's private key in order to communicate on customer 130's behalf with clients that request secure connections.

After the SSL handshake has been completed (step 315a) and the necessary keys exchanged between client 310 and proxy server 320, client 310 will typically make an HTTP request or HTTPS request to proxy server 320 using the secure connection (step 310b). If client 310 is merely a participant in an SSL DDoS attack, client 310 may either never complete the SSL handshaking process 315a or may never actually request any resources from proxy server 320 over the established secure connection. As previously explained, the SSL handshaking process itself (or even just the first few steps of the SSL handshaking process) may be a sufficient burden on servers that a malicious client would not need to subsequently request any resources from the attacked server after establishing the secure connection. In fact, a malicious client may simply follow the successful creation of an SSL session by requesting additional, separate SSL sessions from the attacked server.

However, if client 310 fails to take action after the successful creation of an SSL session, this failure only makes it easier for proxy server 320 to filter out malicious traffic. In particular, since client 310 never requests any actual resources from proxy server 320 beyond an SSL session, proxy server 320 does not need to further challenge client 310 to validate, and any cleaned traffic that is forwarded from proxy server 320 to application server 330 will exclude further traffic from client 310 by definition. Moreover, even if client 310 attempts to cause harm by subsequently requesting additional SSL sessions that it doesn't intend to actually use from proxy server 320, client 310 will not be able to validate itself in order to proceed to application server 330, and computational burdens caused by client 310's repeated SSL session requests will be borne by proxy server 320, thus protecting application server 330.

In one embodiment, simply filtering out clients 310 that fail either to perform the full SSL handshaking process or to request subsequent resources following the SSL handshaking process may sufficiently segregate malicious traffic that proxy server 320 may forward all remaining traffic to application server 330 without performing any further client-challenge or validation operations. Alternatively, if the remaining traffic is still outside the bounds of what application server 330 would expect to receive under in the absence of a DoS attack, then proxy server 320 may further subject clients 310 that request resources following the SSL handshaking process to one or more client-challenge mechanisms.

If client 310 attempts to request a resource from proxy server 320 following the SSL handshaking process, then proxy server 320 may challenge client 310 to validate, since legitimate and malicious clients alike might make application-layer requests after successfully establishing an SSL session. Thus, FIG. 3 depicts the operations of an exemplary client-challenge mechanism that proxy server 320 may employ—in particular, challenging client 310 to follow through with one or more HTTP redirects.

In one embodiment, client 310 makes an HTTP request to proxy server 320 for a URL resource 311b (step 310b). However, rather than providing the resource associated with URL 311b to client 310 (which proxy server 320 may not even have, since its primary role may be only to perform validation and filtering services), proxy server 320 may send an HTTP redirect message to client 310 (step 320b), for example using a "301" or "302" HTTP response status code. The HTTP redirect message 320b may instruct client 310 to make an HTTP request to URL 321b, which proxy server 320 has generated by hashing the client's IP address with, e.g., a secret string of characters known only to proxy server 320. Proxy server 320 may also set a time limit for client 310 to execute the redirect (operations not depicted). If client 310 successfully validates by honoring the redirect, as further described below, the time limit may nevertheless be important for preventing the same client or another client with the same IP address from achieving validation at a later time by requesting the same URL 321b in the form of a "replay attack."

Since many standard clients are configured to follow through with HTTP redirects as a matter of course, proxy server 320 may assume that client 310 is malicious—e.g., a "dumb" attack script—if client 310 does not make an HTTP request to proxy server 320 for URL 321b within the established time limit. Accordingly, proxy server 320 may blacklist client 310's IP address so that all subsequent requests or communications from client 310 are either ignored or rate-limited.

Alternatively, proxy server 320 may simply whitelist the IP addresses of any clients that successfully follow the redirect. If client 310 honors the redirect, then, in step 310c, client 310 will make an HTTP request to proxy server 320 for the resource associated with hashed URL 321b. When proxy server 320 receives the HTTP request 310c, proxy server 320 may hash the IP address of the client that made the request (client 310) together with the secret string of characters. If the resulting string matches the URL 321b requested in step 310c, then proxy server 320 will know that client 310 has honored a challenge redirect provided by proxy server 320, since client 310 would not have been able to guess the appropriate URL 321b to request in step 310c (not having access to the secret string of characters). Accordingly, proxy server 320 may whitelist client 310's IP address (step 320c) and/or SSL session ID on the assumption that client 310 is a legitimate client and not a "dumb" attack script, and all future requests from client 310 will be forwarded to application server 330. Those skilled in the art will appreciate other ways in which the client that made HTTP request 310c could be linked to the client that made HTTP request 310b, such as creating a simple lookup table on proxy server 320 mapping client 310's IP address or SSL session ID to a random URL 321b.

At this point, although client 310 may have been whitelisted, it has still not yet received the original resource that it requested in step 310b. Therefore, in step 320d, proxy server 320 once again redirects client 310, this time to the original URL 311b requested by client 310 in step 310b. In addition, in order to facilitate secure communication between client 310 and application server 330, proxy server 320 may also close the SSL connection (e.g., by sending an SSL "close_notify" message) and the TCP connection with client 310 (step 320e). By closing the SSL connection, client 310 may be forced to establish a new SSL connection by sending a new "ClientHello" message to proxy server 320 (step 310d). When proxy server 320 receives the "ClientHello" message, it will recognize the IP address in the message as a whitelisted IP address (step 320f) and forward the message to application server 330 (step 320g).

Since application server 330 will not recognize client 310 at this point, application server 330 will likely require client 310 to perform a new, full SSL handshake in which new keys may be exchanged and used for secure communication between application server 330 and client 310 (operations not depicted). Thereafter, all communications between application server 330 and client 310 may pass through proxy server 320 without the need for further validation (step 330a).

The technique of whitelisting clients that successfully honor redirects may be preferable to blacklisting clients that fail to honor redirects in light of complications with clients that operate from behind a Network Address Translation ("NAT") service. In a NAT network, multiple clients may be assigned internal IP addresses (typically using a 10.0.0.0/8 address space) that are valid only within the NAT sub-network. All network layer communications from devices within the NAT sub-network to devices outside of the NAT sub-network are sent to a NAT-enabled router, which maps internal IP addresses of the devices to one or more external IP addresses and port numbers and forwards those communications to external devices using the external IP addresses and port numbers. Thus, multiple clients behind a NAT may (and often do) share a single IP address.

Thus, if client 310 fails to honor a redirect and proxy server 320 responds by blacklisting client 310's IP address, then proxy server 320 may risk erroneously blacklisting other, legitimate clients if client 310 is operating from behind a NAT, since other, legitimate clients may share that same IP address. Likewise, if proxy server 320 simply whitelists the IP address of clients that successfully honors a redirect, then proxy server 320 risks a situation in which malicious clients may be able to communicate with application server 330 simply because they share an IP address with a legitimate client that may have previously validated that IP address. In one embodiment, the problem of validating clients behind a NAT may be handled by whitelisting or blacklisting client IP addresses in combination with client port numbers or SSL session IDs.

In another embodiment, the HTTP redirect client-challenge mechanism may reduce the amount of traffic directed at application server 330 to a sufficient threshold, even if some malicious clients may still be able to access application server 330. And, if the HTTP redirect client-challenge mechanism does not reduce the traffic to a sufficient threshold, proxy server 320 may apply one or more additional client-challenge mechanisms, such as the mechanisms described with respect to FIGS. 4 and 5, in an incremental fashion until a workable threshold is achieved.

Although the foregoing discussion of the HTTP redirect client-challenge mechanism of FIG. 3 has been described in the context of an SSL or HTTPS connection, those skilled in the art will appreciate that the solution may mitigate against HTTP traffic as well. For example, for HTTP traffic, proxy server 320 may require HTTP client 310 to request redirect URL 321b and, after receiving such a request, whitelist the client IP address and redirect the client to request to the originally requested URL for application server 330.

Figure 4:
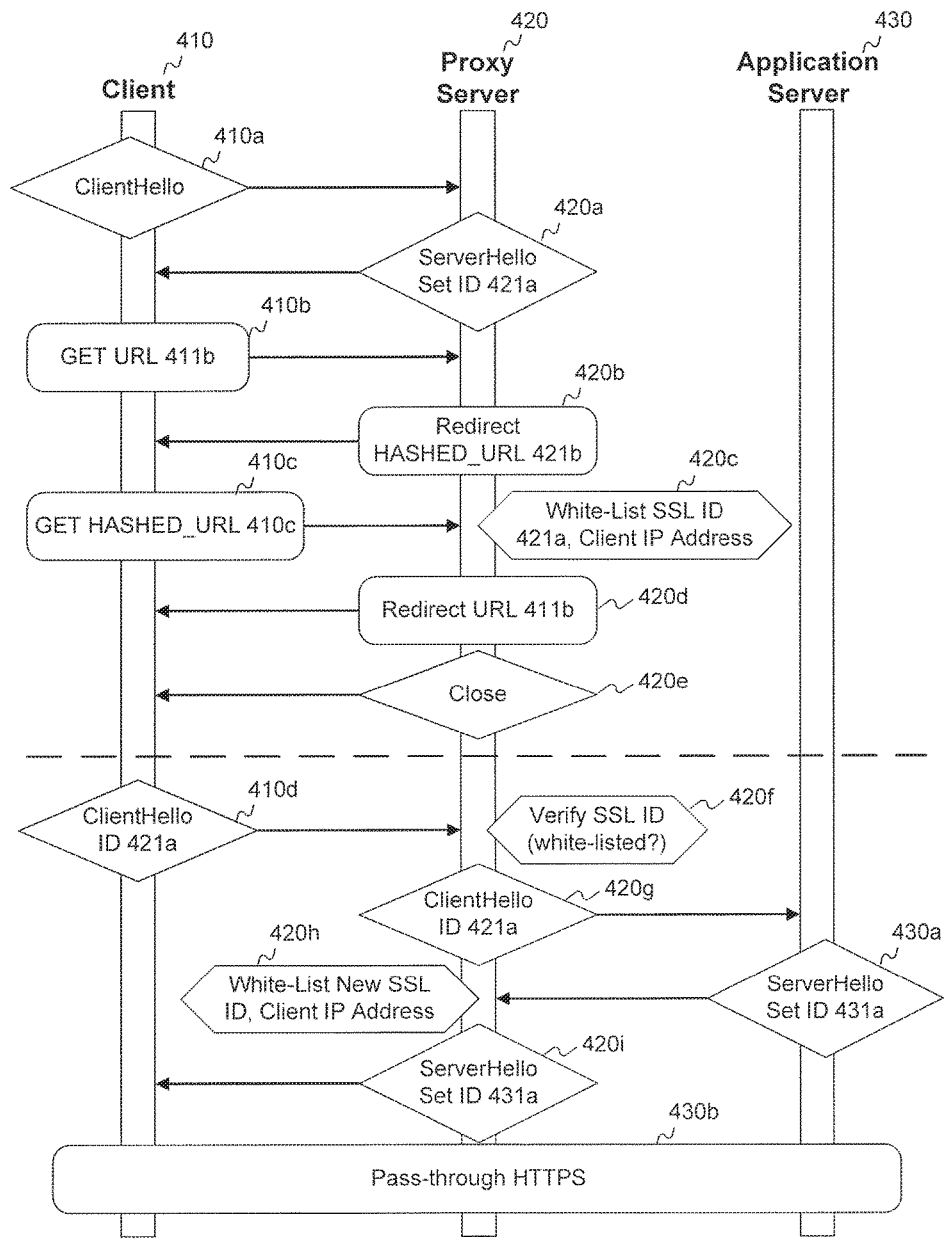
FIG. 4 is a flow diagram illustrating an exemplary method of validating clients using SSL session resumption, consistent with certain disclosed embodiments.

FIG. 4 is a flow diagram illustrating an exemplary method of validating clients using SSL resumption, consistent with certain disclosed embodiments. In some embodiments, if the HTTP redirect client-challenge mechanism of FIG. 3 does not reduce the amount of whitelisted traffic to a sufficient threshold, SSL clients may be subjected to an additional challenge to perform SSL resumption.

SSL resumption is essentially an abbreviated SSL handshaking process in which clients and servers may open a new SSL connection by resuming a previous SSL session rather than creating a new SSL session. In particular, during a full SSL handshake, in which a new SSL session between a client and a server is created, prior to exchanging any symmetric keys, the client and the server must first establish a secure connection using public key encryption. Since public key encryption requires operationally expensive exponentiation operations, SSL resumption achieves efficiencies by allowing clients and servers to establish a new SSL connection that relies on symmetric keys that were securely exchanged (e.g., by public key encryption) during a previous SSL connection.

Whereas an SSL "connection" may refer to a period during which a client and a server are actively communicating (or connected via a TCP connection) using a set of agreed upon symmetric keys, an SSL "session" may refer to any period of time (e.g., days) in which a client and a server have an agreed upon set of symmetric keys. An SSL session, therefore, may span multiple SSL connections, and a client request to establish a new SSL connection using a previously agreed upon set of symmetric keys is a request to "resume" a previous SSL session.

Both the client and the server are able to uniquely identify an SSL session using an SSL session ID (or "SSL ID"). When establishing a new SSL session, the server generates an SSL session ID assigned to the client and transmits it to the client as part of the server's "ServerHello" message. In FIG. 4, these operations are depicted in steps 410a and 420a, in which client 410 requests a new SSL session by transmitting a "ClientHello" message to proxy server 420 (step 410a), and proxy server 420 responds with a "ServerHello" message that includes an SSL session ID 421a (step 420a). In some embodiments steps 410a and 420a may be the same as steps 310a and 320a. If client 410 is responsive to the "ServerHello" message of step 420a, client 410 and proxy server 420 may complete the full SSL handshake process as in step 315a of FIG. 3.

Proxy server 420 may respond to an HTTP request for a URL 411b (step 410b) with an HTTP redirect to a hashed URL 421b in order to validate client 410 (step 420b). If client 410 follows through with the redirect by requesting hashed URL 421b (step 410c), proxy server 420 may whitelist client 410 (step 420c). In some embodiments, rather than whitelisting client 410's IP address, which might obscure the existence of multiple distinct clients behind a NAT, proxy server 420 may whitelist the SSL session ID 421a, either alone or in combination with client 410's IP address. SSL session ID 421a may be sufficient to identify client 410, even if there are other clients that share the same IP address.

Since client 410 has now been whitelisted, proxy server 420 redirects client 410 back to the original URL 411b that client 410 requested in step 410b (step 420d). In addition, proxy server 420 closes the SSL connection (e.g., by sending an SSL "close_notify" message) and its TCP connection with client 410 (step 420e). Notably, when closing the SSL connection, proxy server 420 may take care not to close the SSL session. In this embodiment, client 410 will not be able to immediately request URL 411b from proxy server 420, but instead client 410 will need to first establish a new SSL connection, which will require client 410 to initiate an SSL handshake by transmitting another "ClientHello" message (step 410d).

At this point, a legitimate client would be most likely to request resumption of the SSL session it had established with proxy server 420 moments prior. Thus, if client 410 is legitimate, it will likely include SSL session ID 421a in its "ClientHello" message in step 410d. Once proxy server 420 receives SSL session ID 421a from client 410, proxy server 420 may verify that it previously whitelisted the SSL session ID and/or SSL session ID/IP address combination (step 420f) and therefore assume that client 410 is legitimate.

If, however, client 410 does not request SSL session resumption by transmitting SSL session ID 421a in its "ClientHello" message, then client 410 may appear no different from any other client that requests a new SSL session in step 410a, and will therefore be required to perform the same challenge steps it had previously performed (e.g., steps 410b, 420b, 410c, 402d, etc.), potentially in an infinite-loop fashion. As such, client 410 may never reach application server 430, effectively being blacklisted by virtue of being repeatedly challenged by proxy server 420.

Returning to the case when client 410 does request SSL session resumption, proxy server 420 may forward client 410's SSL connection request, including the SSL session ID 421a to application server 430 (step 420g). However, since application server 430 may not have established any previous SSL session with client 410, application server 430 may not recognize SSL session ID 421a. Accordingly, application server 430 may require client 410 to perform a new, full SSL handshake by generating a new SSL session ID 431a and transmitting the new ID to client 410 as part of application server 430's "ServerHello" message (step 430a). Because communications between application server 430 and client 410 are still being routed through proxy server 420, proxy server 420 may receive application server 430's "ServerHello" message (containing the new SSL session ID 431a) and relay it to client 410 (step 420i). Thereafter, application server 430 and client 410 may communicate in a secured manner using proxy server 420 as an intermediary (step 430b)

In addition to relaying application server 430's "ServerHello" message, proxy server 420 may also inspect the message packet to note the new SSL session ID 431a that application server 430 has assigned to client 410 and to whitelist that session ID (step 420h). Proxy server 420 may whitelist the new SSL session ID 431a so that when client 410 makes future requests to application server 430 through proxy server 420 containing the new SSL session ID 431a, rather than the previously whitelisted SSL session ID 421a, proxy server 420 may be able to recognize client 410 as a whitelisted client and forward client 410's communications to application server 430. Otherwise, proxy server 420 may not recognize the new SSL session ID 431*a*, and may require client 410 to validate again.

In one aspect of the invention, after application server 430 and client 410 have successfully established an SSL session and proxy server 420 has whitelisted the new session ID associated with that session, client 410 and application server 430 may then communicate securely through proxy server 420 without allowing proxy server 420 to decrypt their communications (step 430*b*). For example, the entity that owns or operates proxy server 420 may be a third-party service provider, e.g., service provider 140, that should not have access to encrypted communications between application server 430 and client 410 beyond the process of initially validating client 410.

Since proxy server 420 may already have a copy of application server 430's private key, secure communication between application server 430 and client 410 may be achieved in a number of ways. In one embodiment, proxy server 420 may ignore the contents of communications between application server 430 and client 410 during the SSL handshaking process between the devices (other than to detect the SSL session ID needed to determine whether client 410 had been whitelisted). Once the SSL handshaking process between application server 430 and client 410 is complete, application server 430 and client 410 may have agreed upon a set of symmetric keys for encrypting communications between them. By ignoring the contents of this handshaking process, proxy server 420 would not know which symmetric keys are being used in the SSL session and therefore would not be able to decrypt communications between application server 430 and client 410 despite having a copy of application server 430's private key.

In another embodiment, application server 430 may maintain a second private key that it does not share with proxy server 420. After client 410 has been validated by proxy server 420, application server 430 could perform a full SSL handshake by sending client 410 a copy of a second public key (corresponding to application server 430's second private key), along with a valid certificate for the second public key, which could be used to securely exchange symmetric keys with client 410. Because proxy server 420 does not have a copy of application server 430's second private key, proxy server 420 will not be able to decrypt SSL handshaking communications from application server 430. This is especially the case if application server 430 imposes a mutual authentication requirement on the handshake (requiring the client to authenticate using its public key and certificate), which may prevent proxy server 420 from engaging in a "man-in-the-middle" attack.

After subjecting clients to an SSL session resumption client-challenge mechanism, proxy server 420 may assess whether resulting whitelisted traffic falls below a particular threshold. In some embodiments, if the SSL session resumption client-challenge mechanism does not reduce the traffic to a sufficient threshold, proxy server 420 may apply additional client-challenge mechanisms, such as the mechanism described with respect to FIG. 5, in an incremental fashion until the threshold is achieved.

Figure 5:
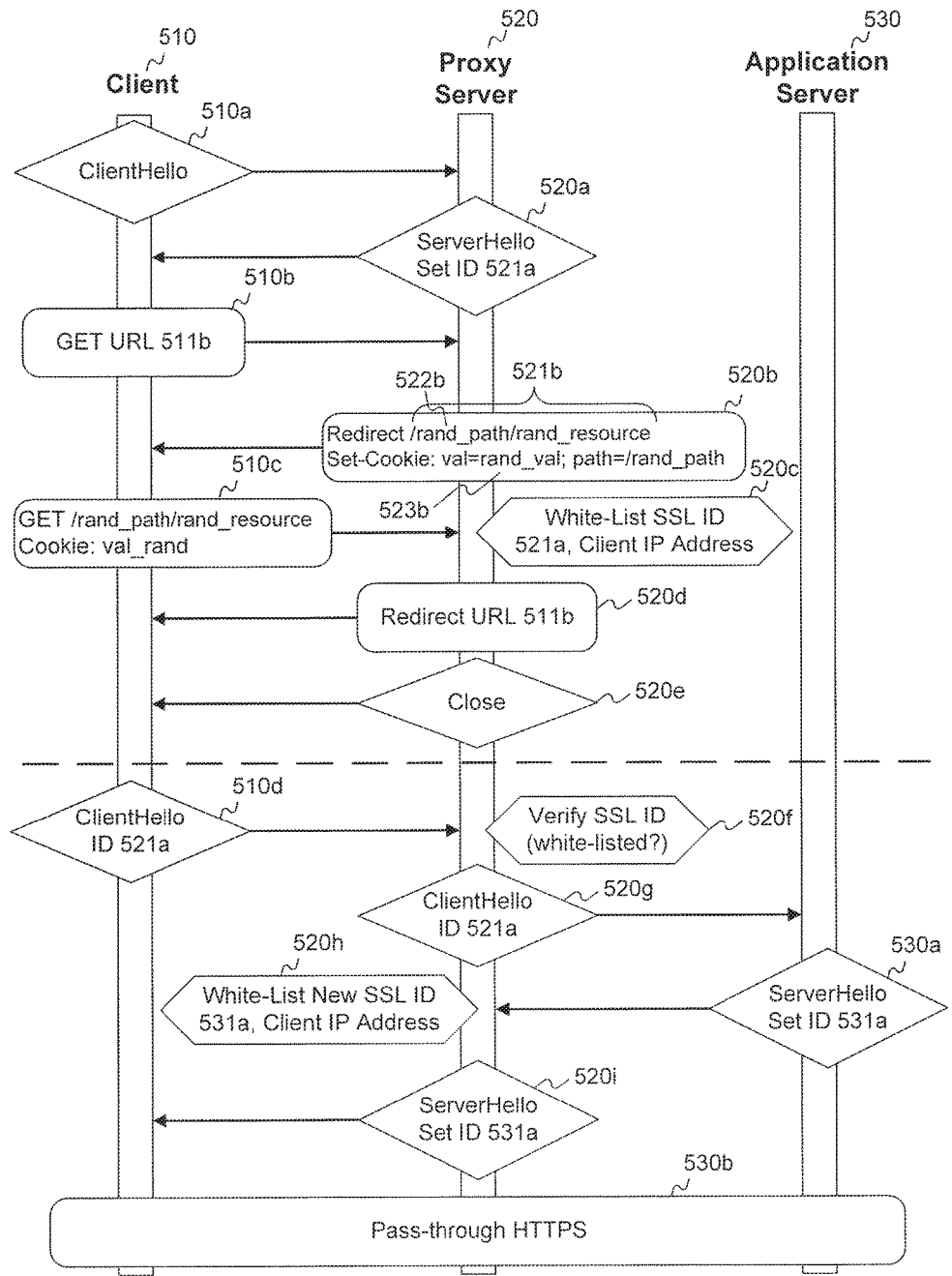
FIG. 5 is a flow diagram illustrating an exemplary method of validating clients using HTTP cookies, consistent with certain disclosed embodiments.

FIG. 5 is a flow diagram illustrating an exemplary method of validating clients using HTTP cookies, consistent with certain disclosed embodiments. When client 510 requests a new SSL session by transmitting a "ClientHello" message to proxy server 520 (step 510*a*), proxy server 520 responds with a "ServerHello" message that includes an SSL session ID 521*a*. Provided that client 510 is responsive to the "ServerHello" message of step 520*a*, client 510 and proxy server 520 may complete the full SSL handshake process, e.g., in a manner similar to that described with respect to step 315*a* of FIG. 3.

Proxy server 520 may respond to an HTTP request for a URL 511*b* (step 510*b*) with an HTTP redirect to a hashed URL 521*b* (step 520*b*). In the embodiment of FIG. 5, proxy server 520 may also include an HTTP cookie in its response (step 520*b*). In one embodiment, proxy server 520 redirects client 510 to a URL 521*b* within a randomly generated path 522*b*. Proxy server 520 may also include an HTTP cookie 523*b* in the response containing a random value and a path attribute corresponding to path 522*b*. The path attribute specifies that client 510 is to return cookie 523*b* to proxy server 520, but only if client 510 makes an HTTP request for a resource within path 522*b*. Cookie 523*b* may also include other attributes, such as "domain," "expires," and "secure."

In order for client 510 to validate, client 510 must not only honor the redirect by requesting URL 521*b*, but must also include HTTP cookie 523*b* in the request by matching the path of URL 521*b* with the path attribute of HTTP cookie 523*b* (step 510*c*). Proxy server 520 may assume that a "dumb" attack script may not include functionality for storing HTTP cookies or following particular cookie rules with respect to path attributes. If proxy server 520 receives the HTTP request for URL 521*b* from client 510, along with the appropriate cookie 523*b* corresponding to the path 522*b* of URL 521*b* and client 510's IP address, then proxy server may whitelist client 510 using its IP address and SSL session ID (step 520*c*).

Thereafter, proxy server 520 may manage communication between client 510 and application server 530 following steps 520*d*, 520*e*, 510*d*, 520*f*, 520*g*, 530*a*, 520*h*, 520*i*, and 530*b*, as shown. In some embodiments, these steps may be analogous to steps 420*d*, 420*e*, 410*d*, 420*f*, 420*g*, 430*a*, 420*h*, 420*i*, and 430*b*. Those skilled in the art will appreciate that foregoing description is merely exemplary for testing the capabilities of a client with respect to its ability to properly store and transmit HTTP cookies for the purpose of validating the client. Those skilled in the art will appreciate that the foregoing technique may be modified or simplified to mitigate against HTTP-based attacks, and not merely HTTPS-based DDoS attacks. For example, for HTTP-based DDoS attacks, proxy server 520 may similarly validate HTTP clients by transmitting HTTP cookies and evaluating the HTTP clients' ability to store and return the HTTP cookies. HTTP clients may be whitelisted using their IP addresses or IP addresses in combination with HTTP cookie values assigned to particular IP addresses by proxy server 520.

Under any of the previously described client-challenge mechanisms, once the client has been validated, the application server and the client may communicate through the proxy server (e.g., as in steps 330*a*, 430*a*, and 530*a*) using a number of techniques. In one embodiment, using FIG. 5 as an example, once client 510 has been validated, proxy server 520 may enable client 510 to communicate with application server 530 by continuing to operate in the role of a proxy server. For example, communications from client 510 to application server 530 may terminate at proxy server 520; proxy server 520 may copy the communication; and proxy server 520 may send a copy of the communication to application server 530. Proxy server 520 may operate similarly with respect to communications from application server 530 directed to client 510.

In this example, communications from proxy server 520 to application server 530 would indicate proxy server 520's IP address in the "Source Address" field of the IP datagram. As such, application server 530 may not be able to determine which clients are making requests to it, since arriving requests would appear to come from proxy server 520. To overcome this limitation, proxy server 520 may allow communications from client 510 to "transparently" pass through proxy server 520 by modifying IP datagrams transmitted by proxy server 520 to application server 530 to indicate client 510's IP address in the "Source Address" field of the datagram rather than proxy server 520's IP address. Proxy server 520 could accomplish this modification using, for instance, the "Netfilter" or "IP sets" framework of the Linux kernel.

Alternatively, proxy server 520 could provide application server 530 with information about requesting client 510 by including client information, such as client 510's IP address, in one or more HTTP headers transmitted to application server 530. In yet another embodiment, proxy server 520 could transition to operating in the mode of a traditional router or link-layer switch by simply forwarding any packets received from client 510 to application server 530 without demultiplexing higher layers of the Internet protocol stack. Under these approaches, application server 530 could be apprised of which clients are requesting resources from application server 530 and could keep records to individually track malicious users or compile information that may be useful for marketing or other analysis.

Returning to FIG. 2, once proxy servers 245 determine that the DoS attack has subsided or that traffic directed to application servers 135 has returned to acceptable levels, proxy servers 245, or other servers associated with service provider 140, may initiate a process of redirecting traffic back to application servers 135. Thus, for example, proxy servers 245 could advertise a BGP "swing" back to application servers 135 in order to remove themselves from the routing path. Alternatively, proxy servers 245 could request a reversal of any previous DNS record alteration to reassign one or more domain names hosted by application servers 135 back to IP addresses associated with application servers 135.

Because proxy servers 245 may have used of customer 130's private key to validate SSL traffic during the mitigation event, proxy servers 245 could attempt to restore security to application servers 135 by, for example, permanently deleting the private key (and any copies of the key) or sending a reminder to customer 130 to revoke the certificate associated with its corresponding public key. Thereafter, proxy servers 245 or monitoring servers 145 may return to monitoring application servers 135 to detect any subsequent DoS attacks and, if necessary, to undertake corrective action, such as the above-described mitigation operations.

In some embodiments, proxy servers 245 may validate SSL traffic directed at application servers 135 without using or obtaining access to customer 130's private key. For example, clients requesting HTTPS access to application servers 135 may be required by proxy servers 245 to using a challenge mechanism, such as the above-described HTTP redirect or HTTP cookie client-challenge mechanisms, that may be implemented over HTTP. Once proxy servers 245 validate a client over HTTP, the validated client is allowed to access application servers 135 using HTTPS (e.g., using HTTPS port 443). Validated clients may be whitelisted using their IP addresses or IP addresses in combination with other information. To protect against potential misuse of port 443 by the whitelisted clients, proxy servers 245 may limit the number of connections to port 443 that whitelisted clients may have open at any given time.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, although described in connection with a third-party mitigation service, the above-described client-challenge mechanisms could also be performed by the application servers themselves. The steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer-implemented method of mitigating against a denial of service (DoS) attack, comprising:
   detecting a DoS attack or potential DoS attack against a first server system comprising one or more servers;
   in response to detecting the DoS attack or potential DoS attack, receiving, at a second server system comprising one or more servers, network traffic directed to the first server system;
   subjecting requesting clients to at least one challenge mechanism by directing clients to complete the at least one challenge mechanism until a portion of network traffic originating from non-suspect clients reaches a threshold, the at least one challenge mechanism comprising challenging requesting clients to request Secure Sockets Layer (SSL) session resumption;
   identifying one or more non-suspect clients, the one or more non-suspect clients corresponding to requesting clients that successfully complete the at least one challenge mechanism;
   identifying one or more suspect clients, the one or more suspect clients corresponding to requesting clients that do not successfully complete the at least one challenge mechanism; and
   forwarding, by the second server system, traffic corresponding to the one or more non-suspect clients to the first server system.

2. The method of claim 1, further comprising:
   redirecting network traffic directed to the first server system to the second server system in response to detecting the DoS attack or potential DoS attack against the first server system.

3. The method of claim 2, further comprising:
   detecting a sufficient mitigation of the DoS attack or potential DoS attack; and
   redirecting the network traffic directed to the first server system back to the first server system.

4. The method of claim 2, wherein redirecting network traffic directed to the first server system to the second server system further comprises:
   transmitting one or more Border Gateway Protocol (BGP) messages to advertise that traffic directed to the first server system should be routed through the second server system.

5. The method of claim 2, wherein redirecting network traffic directed to the first server system to the second server system further comprises:
requesting a Domain Name Services (DNS) record alteration to reassign one or more domain names assigned to one or more Internet Protocol (IP) addresses associated with the first server system to one or more IP addresses associated with the second server system.

6. The method of claim 1, wherein the DoS attack comprises an SSL DoS attack.

7. The method of claim 6, wherein receiving, at the second server system, network traffic directed to the first server system comprises:
using, by the second server system, one or more encryption keys belonging to an owner of the first server system to decrypt secure network traffic directed to the first server system, wherein the first server system and the second server system are owned by different entities.

8. The method of claim 7, wherein the second server system uses one or more private asymmetric encryption keys belonging to the owner of the first server system.

9. The method of claim 1, wherein the first server system and the second server system are owned by different entities.

10. The method of claim 9, wherein an owner of the second server system provides the operations of identifying suspect and non-suspect clients and forwarding traffic from non-suspect clients as part of a commercial DoS attack mitigation service.

11. The method of claim 1, wherein subjecting requesting clients to complete at least one challenge mechanism comprises:
categorizing the client as non-suspect in response to a determination that the client has correctly requested SSL session resumption.

12. The method of claim 11, wherein challenging the client to request SSL session resumption comprises:
establishing, by the second server system, an SSL session and an SSL connection with the client, wherein the SSL session includes an SSL session ID particularly associated with the client;
closing the SSL connection with the client; and
categorizing the client as non-suspect in response to a determination that the client has subsequently requested a new SSL connection using the SSL session ID particularly associated with the client.

13. The method of claim 1, wherein identifying one or more non-suspect clients further comprises:
whitelisting clients that successfully complete one or more challenge mechanisms.

14. The method of claim 13, further comprising:
whitelisting clients that successfully complete the at least one challenge mechanism using at least SSL session IDs particularly associated with the successful clients.

15. The method of claim 1, wherein identifying one or more suspect clients further comprises:
blacklisting clients that fail to complete the at least one challenge mechanism.

16. The method of claim 1, wherein forwarding, by the second server system, traffic corresponding to the one or more non-suspect clients to the first server system further comprises:
discarding traffic corresponding to suspect clients.

17. The method of claim 1, wherein forwarding, by the second server system, traffic corresponding to the one or more non-suspect clients to the first server system further comprises:
rate-limiting traffic corresponding to suspect clients.

18. The method of claim 1, wherein forwarding, by the second server system, traffic corresponding to the one or more non-suspect clients to the first server system further comprises:
operating as an intermediary for communications between a client and the first server system once the client has been identified as non-suspect.

19. The method of claim 18, further comprising:
decrypting, by the second server system, secure communications from the client to determine whether the client is suspect or non-suspect; and
after determining that the client is non-suspect, operating as an intermediary for secure communications between the client and the first server system without decrypting the secure communications between the client and the first server system.

20. The method of claim 18, further comprising:
enabling communications from the client to the first server system to pass through the second server system in a manner that preserves the client's IP address.

21. The method of claim 20, further comprising:
including the client's IP address in an HTTP header in a communication from the second server system to the first server system forwarding a communication from the client directed to the first server system.

22. The method of claim 20, further comprising:
operating, by the second server system, as a router to allow communications from the client to the first server system to terminate at the first server system.

23. The method of claim 20, further comprising:
transmitting a first communication from the second server system to the first server system forwarding a previously received second communication from the client directed to the first server system; and
modifying the first communication from the second server system to the first server system to substitute the client's IP address for the second server system's IP address.

24. A system for mitigating against a denial of service (DoS) attack, comprising:
a processing system comprising one or more processors;
one or more communications ports for receiving communications from one or more networked devices and transmitting communications to one or more networked devices; and
a memory system comprising one or more computer-readable media, wherein the computer-readable media store instructions that, when executed by the processing system, cause the system to perform the operations of:
detecting a DoS attack or potential DoS attack against a first server system comprising one or more servers;
in response to detecting the DoS attack or potential DoS attack, receiving, at a second server system comprising one or more servers, network traffic directed to the first server system;
subjecting requesting clients to at least one challenge mechanism by directing clients to complete the at least one challenge mechanism until a portion of network traffic originating from non-suspect clients reaches a threshold, the at least one challenge mechanism comprising challenging requesting clients to request Secure Sockets Layer (SSL) session resumption;
identifying one or more non-suspect clients, the one or more non-suspect clients corresponding to requesting clients that successfully complete the one or more challenge mechanisms;

identifying one or more suspect clients, the one or more suspect clients corresponding to requesting clients that do not successfully complete the one or more challenge mechanisms; and forwarding, by the second server system, traffic corresponding to the one or more non-suspect clients to the first server system.

25. The system of claim 24, the operations further comprising:

redirecting network traffic directed to the first server system to the second server system in response to detecting the DoS attack or potential DoS attack against the first server system.

26. The system of claim 24, the operations further comprising:

detecting a sufficient mitigation of the DoS attack or potential DoS attack; and redirecting the network traffic directed to the first server system back to the first server system.

27. The system of claim 24, wherein redirecting network traffic directed to the first server system to the second server system further comprises:

transmitting one or more Border Gateway Protocol (BGP) messages to advertise that traffic directed to the first server system should be routed through the second server system.

28. The system of claim 24, wherein redirecting network traffic directed to the first server system to the second server system further comprises:

requesting a Domain Name Services (DNS) record alteration to reassign one or more domain names assigned to one or more Internet Protocol (IP) addresses associated with the first server system to one or more IP addresses associated with the second server system.

29. The system of claim 24, wherein the DoS attack comprises an SSL DoS attack.

30. The system of claim 29, wherein receiving, at the second server system, network traffic directed to the first server system comprises:

using, by the second server system, one or more encryption keys belonging to an owner of the first server system to decrypt secure network traffic directed to the first server system, wherein the first server system and the second server system are owned by different entities.

31. The system of claim 30, wherein the second server system uses one or more private asymmetric encryption keys belonging to the owner of the first server system.

32. The system of claim 24, wherein the first server system and the second server system are owned by different entities.

33. The system of claim 32, wherein an owner of the second server system provides the operations of identifying suspect and non-suspect clients and forwarding traffic from non-suspect clients as part of a commercial DoS attack mitigation service.

34. The system of claim 24, wherein subjecting requesting clients to at least one challenge mechanism comprises:

categorizing the client as non-suspect in response to a determination that the client has correctly requested SSL session resumption.

35. The system of claim 34, wherein challenging the client to request SSL session resumption comprises:

establishing, by the second server system, an SSL session and an SSL connection with the client, wherein the SSL session includes an SSL session ID particularly associated with the client;

closing the SSL connection with the client; and categorizing the client as non-suspect in response to a determination that the client has subsequently requested a new SSL connection using the SSL session ID particularly associated with the client.

36. The system of claim 24, wherein identifying one or more non-suspect clients further comprises:

whitelisting clients that successfully complete one or more challenge mechanisms.

37. The system of claim 36, the operations further comprising:

whitelisting clients that successfully complete one or more challenge mechanisms using at least SSL session IDs particularly associated with the successful clients.

38. The system of claim 24, wherein identifying one or more suspect clients further comprises:

blacklisting clients that fail to complete one or more challenge mechanisms.

39. The system of claim 24, wherein forwarding, by the second server system, traffic corresponding to the one or more non-suspect clients to the first server system further comprises:

discarding traffic corresponding to suspect clients.

40. The system of claim 24, wherein forwarding, by the second server system, traffic corresponding to the one or more non-suspect clients to the first server system further comprises:

rate-limiting traffic corresponding to suspect clients.

41. The system of claim 24, wherein forwarding, by the second server system, traffic corresponding to the one or more non-suspect clients to the first server system further comprises:

operating as an intermediary for communications between a client and the first server system once the client has been identified as non-suspect.

42. The system of claim 41, the operations further comprising:

decrypting, by the second server system, secure communications from the client to determine whether the client is suspect or non-suspect; and after determining that the client is non-suspect, operating as an intermediary for secure communications between the client and the first server system without decrypting the secure communications between the client and the first server system.

43. The system of claim 41, the operations further comprising:

enabling communications from the client to the first server system to pass through the second server system in a manner that preserves the client's IP address.

44. The system of claim 43, the operations further comprising:

including the client's IP address in an HTTP header in a communication from the second server system to the first server system forwarding a communication from the client directed to the first server system.

45. The system of claim 43, the operations further comprising:

operating, by the second server system, as a router to allow communications from the client to the first server system to terminate at the first server system.

46. The system of claim 43, the operations further comprising:
- transmitting a first communication from the second server system to the first server system forwarding a previously received second communication from the client directed to the first server system; and
- modifying the first communication from the second server system to the first server system to substitute the client's IP address for the second server system's IP address.

47. The method of claim 1, wherein subjecting requesting clients to the at least one challenge mechanism further comprises directing clients to complete one or more additional challenge mechanisms in an incremental fashion until the portion of network traffic originating from non-suspect clients reaches the threshold.

\* \* \* \* \*